(12) United States Patent
Tamersoy et al.

(10) Patent No.: US 10,452,841 B1
(45) Date of Patent: Oct. 22, 2019

(54) MODELING MALICIOUS BEHAVIOR THAT OCCURS IN THE ABSENCE OF USERS

(71) Applicant: SYMANTEC CORPORATION, Mountain View, CA (US)

(72) Inventors: Acar Tamersoy, Culver City, CA (US); Sandeep Bhatkar, Sunnyvale, CA (US); Daniel Marino, Los Angeles, CA (US); Kevin Alejandro Roundy, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 327 days.

(21) Appl. No.: 15/583,077

(22) Filed: May 1, 2017

(51) Int. Cl.
*G06F 21/55* (2013.01)
*G06N 5/04* (2006.01)
*G06N 20/00* (2019.01)

(52) U.S. Cl.
CPC .......... *G06F 21/552* (2013.01); *G06N 5/04* (2013.01); *G06N 20/00* (2019.01); *G06F 2221/034* (2013.01)

(58) Field of Classification Search
CPC ............ G06N 20/00; G06N 5/04; G06N 3/08; G06N 99/00; H04L 63/1408; H04L 63/1433; H04L 63/1416; H04L 63/14; H04L 63/1425; H04L 43/08; H04L 43/16; G06F 21/50; G06F 21/552; G06F 21/577; G06F 21/55; G06F 21/566; H04H 20/12; H04H 60/33; H04M 2203/6027; Y10S 707/952
See application file for complete search history.

(56) References Cited

U.S. PATENT DOCUMENTS

| 8,401,982 B1 * | 3/2013 | Satish | G06N 20/00 706/20 |
| 2011/0004935 A1 * | 1/2011 | Moffie | G06F 21/53 726/23 |
| 2018/0041536 A1 * | 2/2018 | Berlin | G06N 3/04 |

* cited by examiner

*Primary Examiner* — Brian F Shaw
(74) *Attorney, Agent, or Firm* — Meyertons Hood Kivlin Kowert and Goetzel PC; Rory D. Rankin

(57) ABSTRACT

Systems, apparatuses, methods, and computer readable mediums for modeling malicious behavior that occurs in the absence of users. A system trains an anomaly detection model using attributes associated with a first plurality of events representing system activity on one or more clean machines when users are not present. Next, the system utilizes the trained anomaly detection model to remove benign events from a second plurality of events captured from infected machines when users are not present. Then, the system utilizes malicious events, from the second plurality of events, to train a classifier. Next, the classifier identifies a first set of attributes which are able to predict if an event is caused by malware with a predictive power greater than a threshold.

20 Claims, 11 Drawing Sheets

FIG. 3

| | Attribute$_1$ | Attribute$_2$ | Attribute$_3$ | ... | Attribute$_N$ | Malware? |
|---|---|---|---|---|---|---|
| Event$_A$ | | | | | | 1 |
| ... | | | | | | 1 |
| Event$_M$ | | | | | | 1 |
| Event$_B$ | | | | | | 0 |
| ... | | | | | | 0 |
| Event$_J$ | | | | | | 0 |

Events $Event_A ... Event_M$: Filtered Malicious Events
Events $Event_B ... Event_J$: Events from Clean Machines Attribute$_1$ and Attribute$_3$: Attributes with the Most Predictive Power

FIG. 7

MODELING MALICIOUS BEHAVIOR THAT OCCURS IN THE ABSENCE OF USERS

BACKGROUND

Technical Field

Embodiments described herein relate to computer systems and more particularly, to modeling malicious behavior that occurs in the absence of users.

Description of the Related Art

Computing devices are increasingly vulnerable to different types of malware attacks. In many of these attacks, detecting malicious behavior on computing devices can be challenging. Targeted attacks such as advanced persistent threats occur over long periods of time during which the attackers move slowly and quietly, with behavioral patterns that blend in with non-malicious behaviors. Unfortunately, it is difficult to isolate malicious behavior that happens in the absence of a user, since the background noise of benign behavior on a machine that was recently compromised is likely to drown out the suspicious behavior.

SUMMARY

Systems, apparatuses, and methods for modeling malicious behavior that occurs in the absence of users.

In one embodiment, a system trains an anomaly detection model using attributes associated with a first plurality of events representing system activity on one or more clean machines when users are not present. Next, the system utilizes the trained anomaly detection model to remove benign events from a second plurality of events captured from infected machines when users are not present. Then, the system utilizes malicious events, from the second plurality of events, and benign events from a third plurality of events on another group of clean machines to train a classifier. Next, the classifier identifies a first set of attributes which are able to predict if an event is caused by malware with a predictive power greater than a threshold.

After training the classifier, the system monitors a given machine to determine if the given machine is clean or infected. The system detects and records attributes for a fourth plurality of events on the given machine. Then, the system feeds the classifier with values of the first set of attributes, from the fourth plurality of events, to determine if the given machine is clean or infected. In one embodiment, the classifier generates a prediction on whether the given machine is infected based on values of the first set of attributes from the fourth plurality of events.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 3 is a diagram of one embodiment of an event attribute matrix.
FIG. 7 is a diagram of one embodiment of a matrix of events.

DETAILED DESCRIPTION OF EMBODIMENTS

Figure 1:
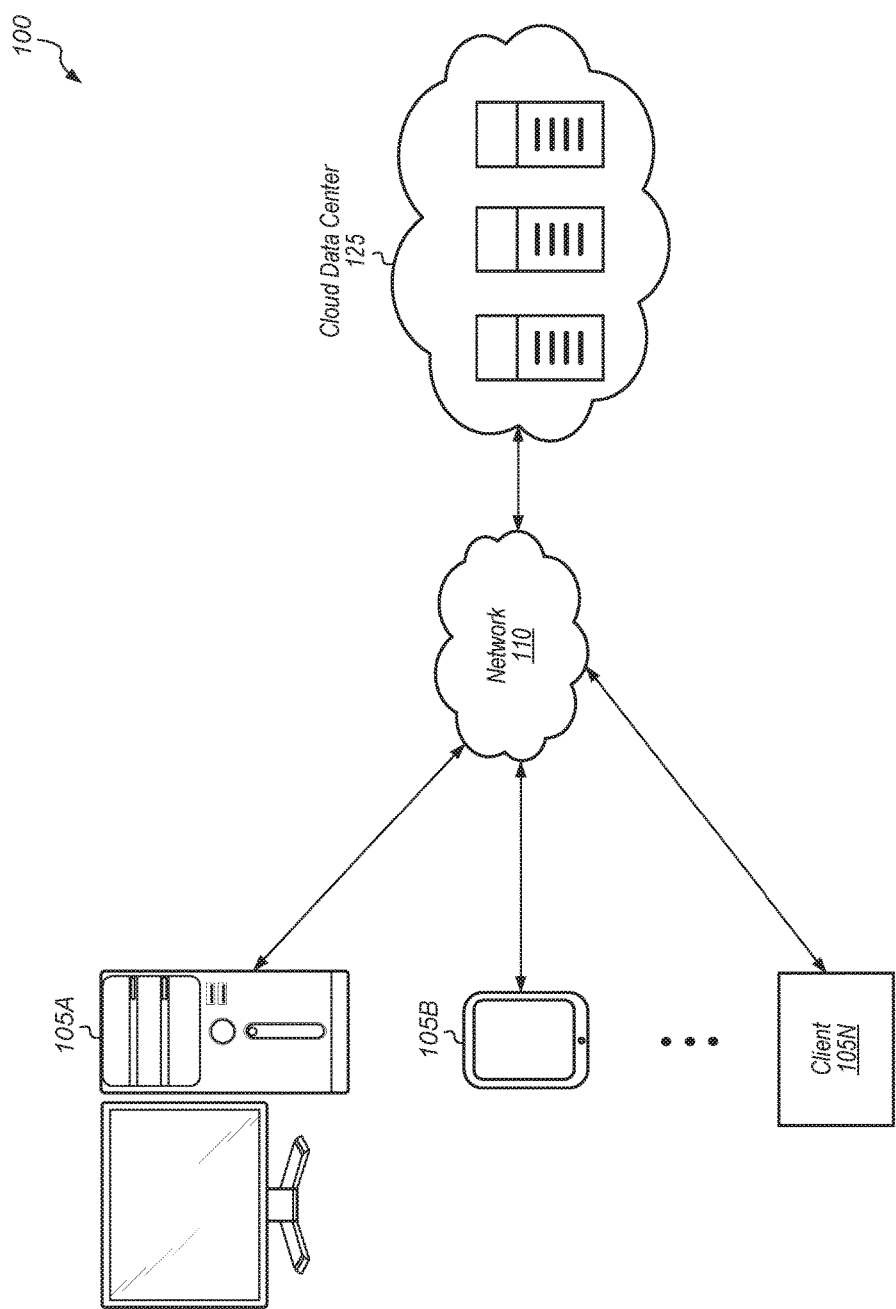
FIG. 1 is a block diagram of one embodiment of a system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising one or more processors . . . ." Such a claim does not foreclose the system from including additional components (e.g., a display unit, a storage unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to"

language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a system with a plurality of machines, the terms "first" and "second" machines can be used to refer to any two of the plurality of machines.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram of one embodiment of a system 100 is shown. System 100 includes clients 105A-N, network 110, and cloud data center 125. Cloud data center 125 may include any number and type of physical machines, such as computers and/or servers (e.g., database server, file server, application server), and any number and type of storage devices. The physical machines of cloud data center 125 include any number and type of processors for executing instructions to carry out the methods and mechanisms described herein. Cloud data center 125 may include any number and type of software applications and agents executing on the processors. It should be understood that cloud data center 125 is representative of any type of public or private data center. It is also noted that system 100 may include other components and/or the components may be arranged differently in other embodiments.

In one embodiment, client 105A is a desktop computer, client 105B is a mobile device, and one or more other clients 105N can be any of various other types of computing devices or computing systems. It is noted that a client may also be referred to as an "endpoint" or a "machine". Also, the term "machine" may be used to refer to any type of computing device or computing system. Each client 105A-N executes software to monitor system behavior. In one embodiment, monitoring system behavior involves detecting a plurality of events that occur on the client and then recording the values of a plurality of attributes associated with each event. An event refers to a particular type of action or operation being detected on the client, with the type of action or operation that is considered to qualify as an event varying from embodiment to embodiment. For example, an event may be downloading a file, a register modification, deleting a file, saving a file, creating a portable executable, reading or writing to storage or memory, and so on. The attributes associated with an event include various pieces of metadata that provide detailed information about the event. Any number and type of attributes may be captured for each event, with the number and type of attributes varying from embodiment to embodiment. Examples of attributes include an identification of the process that created a process or initiated the event, a timestamp, the target directory of the file affected by the event, and other metadata.

The attributes for events of a plurality of clients 105A-N may be captured and conveyed to monitoring software running on cloud data center 125. The monitoring software may accumulate a large number of events for many different clients 105A-N. Over a given period of time, the monitoring software may identify which of the clients 105A-N have been infected with malware and which of the clients 105A-N have not been infected with malware. The monitoring software may receive indications from other software which is able to detect or determine if clients 105A-N have been infected with malware. Accordingly, in one embodiment, the monitoring software separates the event data into two separate groups—a first group of events corresponds to clean (i.e., devoid of malware or believed to be devoid of malware) machines and a second group of events corresponds to infected machines. It is noted that in some embodiments, the monitoring software may also separately organize the event data according to machine type (e.g., server, personal computer, mobile device) and/or operating system (e.g., Windows®, Android®, iOS®).

In one embodiment, the monitoring software utilizes the event data for a plurality of clean machines to train an anomaly detection model. Then, the event data for a plurality of infected machines is provided as an input to the trained anomaly detection model. The trained anomaly detection model filters out the benign events from the event data from the infected machines so that only malicious events remain. These malicious events are then provided to a classifier (e.g., logistic regression model). It is noted that these malicious events may themselves have the appearance of ordinary non-malicious events that might otherwise occur. Also, additional benign events from a different set of clean machines are provided as other inputs to the classifier. The classifier then identifies those attributes which have the highest predictive power for determining if an event is malicious. The classifier may then be used to monitor events from machines that have not yet been classified as clean or malicious, and the classifier may utilize the values of the highly predictive attributes to make a prediction on whether a given machine is malicious (i.e., infected with malware).

In one embodiment, clients 105A-N include software agents (not shown) which are configured to monitor the system behavior on clients 105A-N. The software agents are configured to determine when a user is actually present on the respective client. The software agents may utilize any of various tools for determining if a user is present when an event occurs. In one embodiment, an agent utilizes the GetLastInputInfo function for Windows machines. In other embodiments, an agent may utilize other tools to determine if a user is present when an event occurs. An agent may also differentiate between the user being physical present or the user being virtually present (e.g., logging in via a Remote Desktop Connection). The software agents may then separate event data into events that occurred when a user was present and events that occurred when the user was absent. In one embodiment, the software agents on clients 105A-N convey the captured event data to monitoring software executing on cloud data center 125. The monitoring software may utilize the event data to model system behavior in the absence of users.

Network 110 may be any type of network or combination of networks, including wireless connection, direct local area network (LAN), metropolitan area network (MAN), wide area network (WAN), a Public Switched Telephone Network (PSTN), an Intranet, the Internet, a cable network, a packet-switched network, a fiber-optic network, a router, storage area network, or other type of network. Examples of LANs include Ethernet networks, Fiber Distributed Data Interface (FDDI) networks, and token ring networks. Network 110 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 110.

Clients 105A-N are representative of any number of stationary or mobile computers such as desktop personal computers (PCs), mobile devices, servers, server farms, workstations, laptops, handheld computers, servers, personal digital assistants (PDAs), smart phones, tablets, wearable devices, and so forth. Generally speaking, clients 105A-N include one or more processors comprising one or more processor cores. Each processor core includes circuitry for executing instructions according to an instruction set architecture. The processor cores can access cache memory subsystems for data and computer program instructions. The cache subsystems can be coupled to a memory hierarchy comprising random access memory (RAM) and a storage device.

Figure 2:
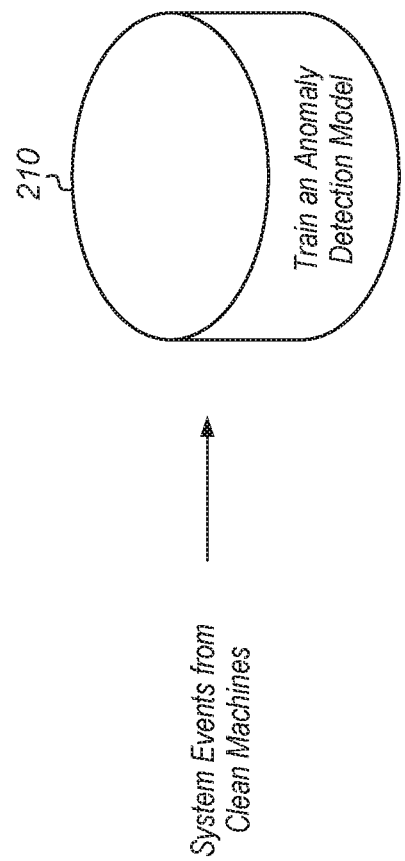
FIG. 2 is a diagram of one embodiment of a model.

Turning now to FIG. 2, a diagram of one embodiment of a model 210. Model 210 is configured to model system behavior that occurs on clean machines in the absence of users. As used herein, a "clean" machine is defined as a machine (e.g., computing system, computing device) that has been determined to be free from malware. As used herein, the term "malware" is defined as software that has been secretly installed on a machine without the users' knowledge. The attackers who caused the malware to run on the machine are often trying to damage or disable the machine, or the attackers may be trying to surreptitiously access information stored on the machine.

The system behavior of the clean machines is used to train an anomaly detection model to detect anomalous behavior that does not fit with the benign behavior observed on clean machines. In one embodiment, the anomaly detection model is an isolation forest model. In other embodiments, the anomaly detection model utilizes any of various other types of algorithms (e.g., k-nearest neighbor, cluster analysis, etc.). Generally speaking, an isolation forest uses an ensemble of random decision trees to perform anomaly detection on the event attribute vectors to obtain average path lengths. At each split, a random feature and a random split point is chosen. It will typically take a lower number of splits to partition anomalous data points that are far away from the rest of the data, and these anomalous data points will have short average path lengths from the root nodes of the trees.

Figure 3:
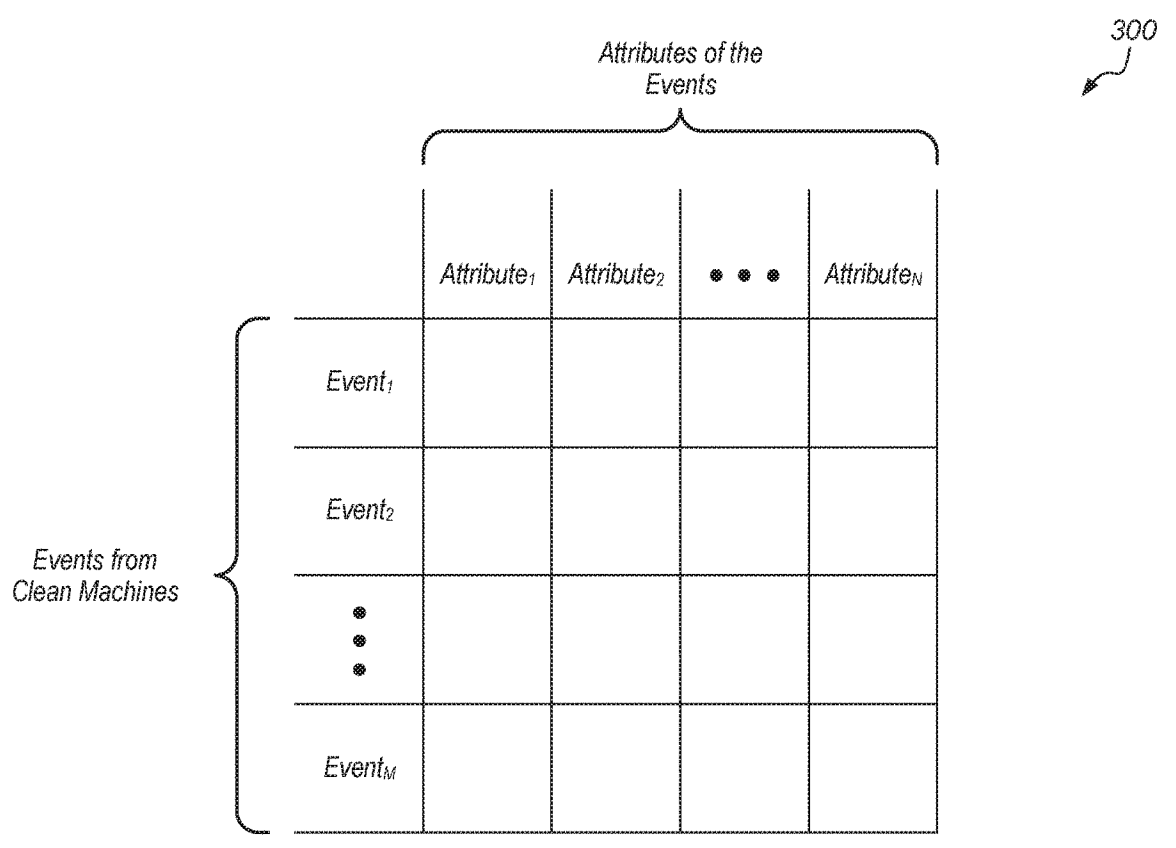

Referring now to FIG. 3, a diagram of one embodiment of an event attribute matrix 300 is shown. In one embodiment, the event attribute matrix 300 is provided as an input to an anomaly detection model as shown in FIG. 2. It is noted that the attributes 1-N of the events 1-M may be provided to the anomaly detection model in any type of format, with the format varying from embodiment to embodiment.

The events shown as the rows of matrix 300 are events captured from clean machines. The types of events that are captured may vary from embodiment to embodiment. In one embodiment, examples of events include a process being initiated, an input/output (I/O) request, a network request, a memory access, a system software update, a download, and so on. For each event, a plurality of attributes are captured which provide information about the event at a fine granularity. The number and type of attributes that are recorded may vary from embodiment to embodiment. Examples of attributes include a timestamp, a target folder, a process responsible for the event, and so on.

Additionally, different events may have different sets of attributes which are captured for these events. In other words, for a first type of event, a first set of attributes are captured and for a second type of event, a second set of attributes are captured. Some of the attributes of the first set of attributes may be included in the second set, while other attributes may be in the first set while not in the second set. In other embodiments, there may be a fixed set of attributes that are captured for each event.

Figure 4:
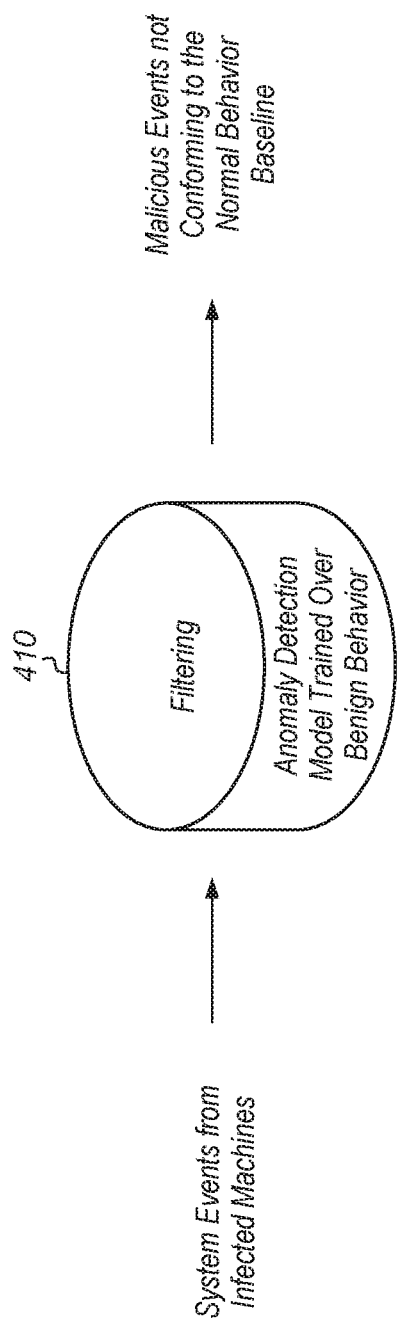
FIG. 4 is a diagram of one embodiment of identifying malicious events from all system events of infected machines.

Turning now to FIG. 4, a diagram of one embodiment of identifying malicious events from all system events of infected machines is shown. In one embodiment, system events from infected machines being are as inputs to the anomaly detection model 410 which was previously trained over benign behavior as shown in FIG. 2. As used herein, the term "infected machine" is defined as a machine that has malware installed and/or executing on the machine. Any of various tools may be employed to identify if a machine is infected with malware. It may be assumed for the purposes of this discussion that a tool has identified one or more machines as infected. The attributes of a plurality of events may then be captured and recorded for these infected machine(s).

The system events from the infected machines that are provided as inputs to the anomaly detection model 410 include both malicious events and benign events. Each event provided to anomaly detection model 410 includes a plurality of attributes associated with the event. The trained anomaly detection model 410 filters out the benign events from the system events and outputs the malicious events which do not conform to the normal behavior baseline.

Figure 5:
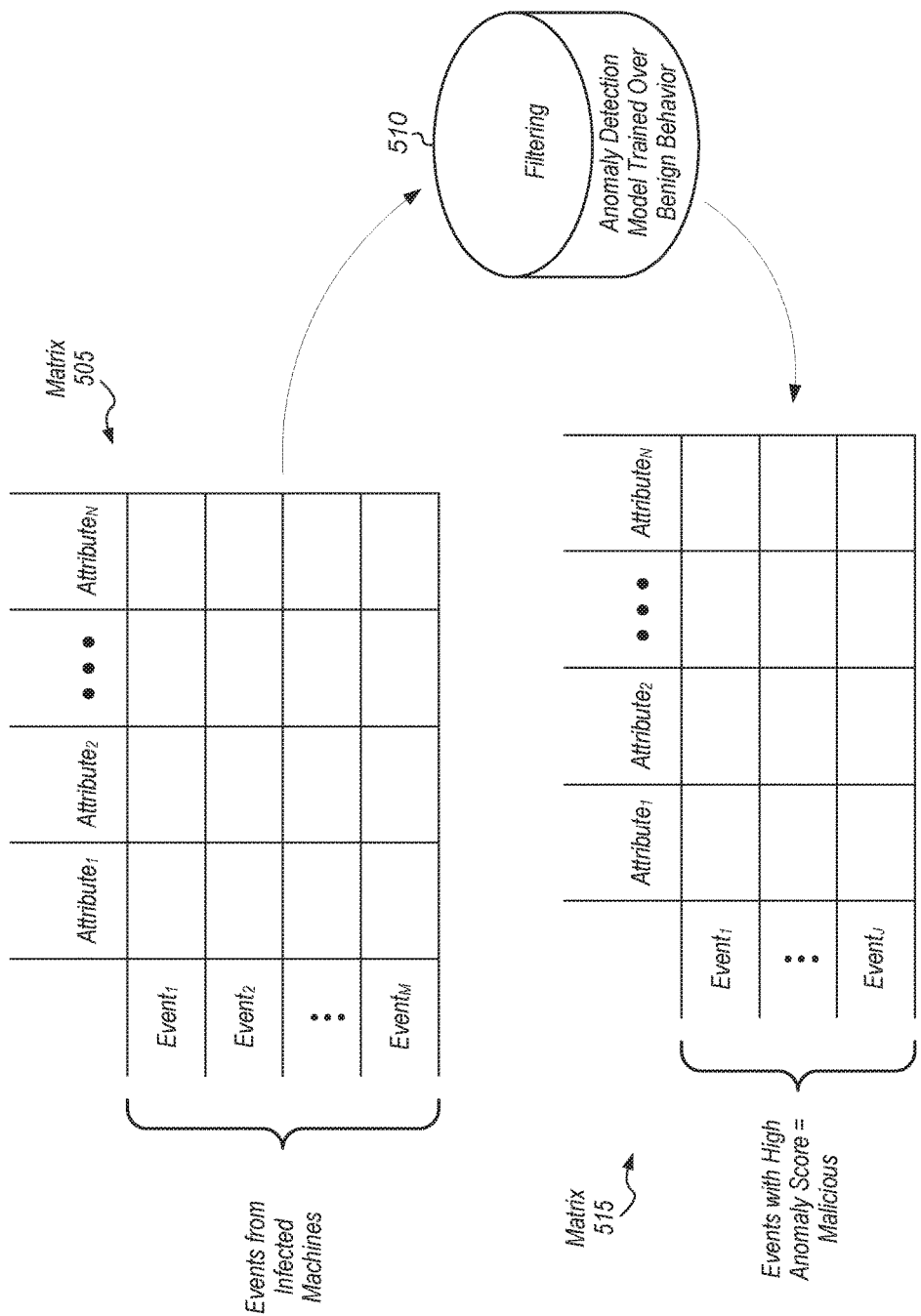
FIG. 5 is a diagram of one embodiment of filtering out benign events from a set of events collected from infected machines.

Referring now to FIG. 5, a diagram of one embodiment of filtering out benign events from a set of events collected from infected machines is shown. In one embodiment, a set of events are collected from infected machines. These events are shown as the rows of matrix 505. The columns of matrix 505 are the different attributes that are captured for each event. In one embodiment, the events collected from the infected machine are events which occurred within a 24 hour window of the machine being detected as being infected. Accordingly, in this embodiment, events that occur 24 hours before or 24 hours after malware has been detected on the machine are collected and provided to the anomaly detection model 510 trained over benign behavior. In other embodiments, other time windows may be utilized for collecting events of infected machines.

Anomaly detection model 510 is configured to filter out the benign events related to normal system activity while retaining only the events related to malicious activity. Anomaly detection model 510 filters out the events related to benign activity by determining which events have a high anomaly score, and then these events are classified as malicious events. These malicious events are shown as the rows of matrix 515.

Figure 6:
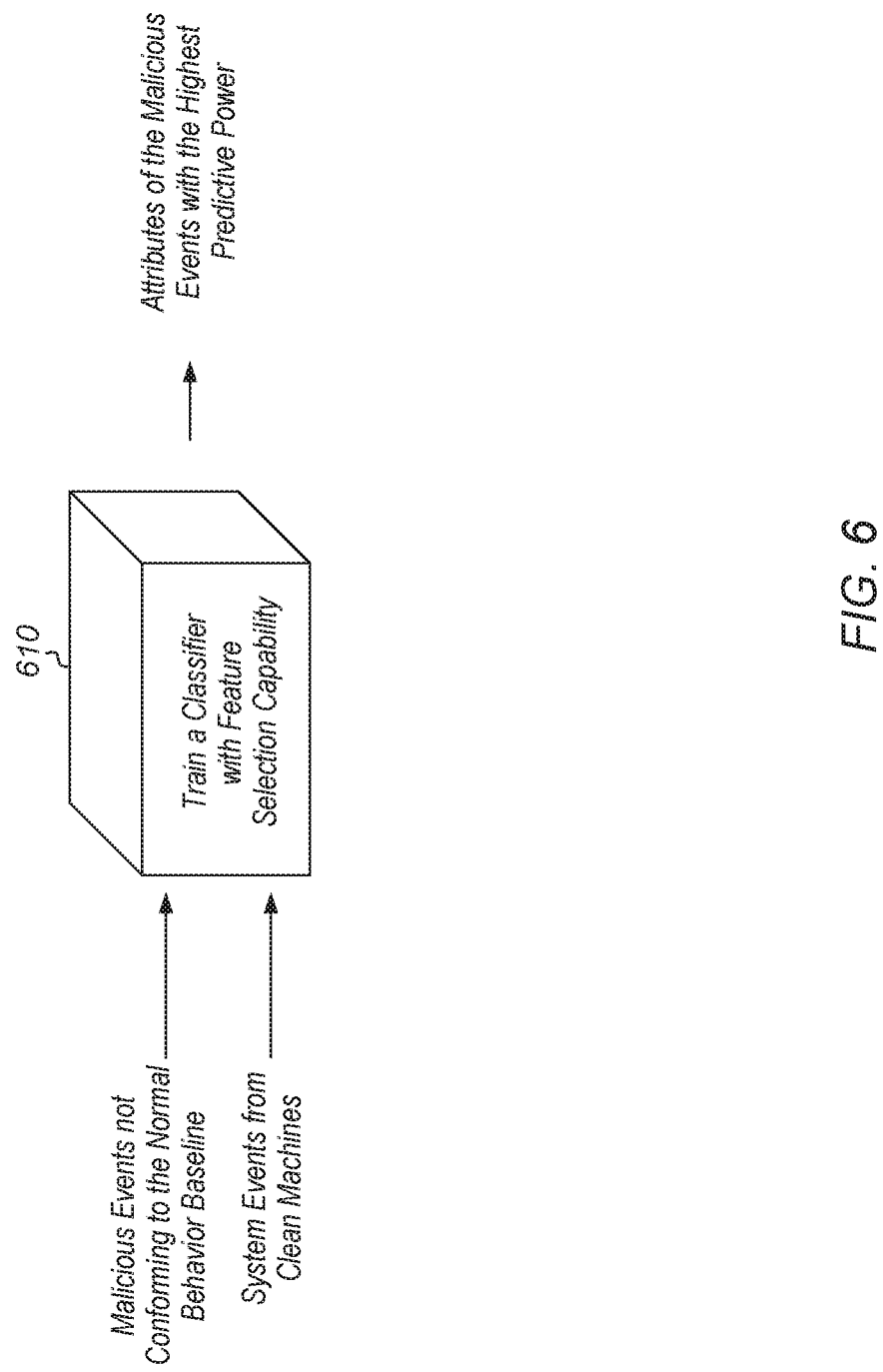
FIG. 6 is a diagram of one embodiment of a technique for training a logistic regression model to identify attributes of the malicious events with the highest predictive power.

Turning now to FIG. 6, a diagram of one embodiment of a technique for training a classifier to identify attributes of the malicious events with the highest predictive power is shown. The malicious events not conforming to the normal behavior baseline (shown in matrix 515 of FIG. 5) are provided as inputs to train classifiers with feature selection capability 610. Also, system events from clean machines are provided as inputs to train classifier 610. In one embodiment, the clean machines being monitored so as to train classifier 610 are different from the clean machines used to train anomaly detection model 210 in FIG. 2. The classifier 610 is configured to identify attributes of the malicious events with the highest predictive power. In one embodiment, these attributes with the highest predictive power allow a predictor or classifier to determine if a machine under observation is clean or infected. In one embodiment, classifier 610 is a least absolute shrinkage and selection operator (LASSO) logistic regression model. In other embodiments, classifier 610 can be based on other types of models.

Referring now to FIG. 7, one embodiment of a matrix 700 of events is shown. Matrix 700 includes events A-M in the top rows of matrix 700 which are filtered malicious events. The events B-J in the bottom rows of matrix 700 are the events from clean machines. The identification of which rows correspond to infected machines and which rows correspond to clean machines is indicated by the "malware?" column on the right-side of matrix 700.

A classifier (e.g., logistic regression model 610 of FIG. 6) is configured to identify the attributes with the most predictive power for determining if an event was caused by malware. It is assumed for the purposes of this discussion that the classifier has identified $Attribute_1$ and $Attribute_3$ as the attributes with the most predictive power. Accordingly, the values of $Attribute_1$ and $Attribute_3$ for a machine under observation may be used by a classifier to determine whether the machine has been infected by malware.

In one embodiment, a supervised learning model is trained using a classification technique with feature selection capability. In one embodiment, penalized logistic regression with lasso penalty is utilized for the supervised learning model. Cross-validation may be utilized to evaluate how well the supervised learning model can distinguish malicious behavior from benign behavior. For example, various performance metrics may be computed, such as true positive rate, false positive rate, F1-measure, etc. The features selection performed by the classification technique will output the features that have the most statistical power in correctly predicting a behavior as malicious. Out of all of the features (i.e., attributes) captured for each event, not every feature is expected to have statistical power to distinguish malicious from benign behavior. Some features may have a higher predictive power relative to other features for predicting malicious behavior. The supervised learning model will be trained to identify these features with greater predictive power relative to other features.

Figure 8:
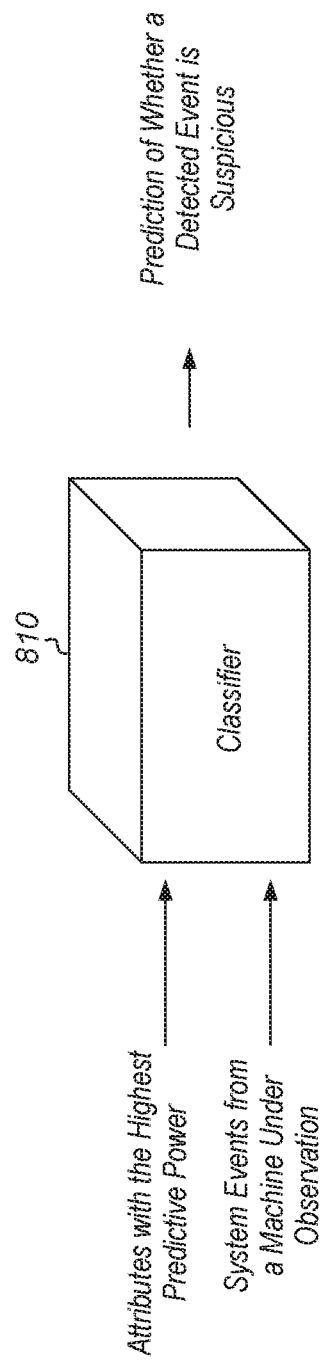
FIG. 8 is a diagram of one embodiment of a classifier for predicting whether a machine under observation is infected.

Turning now to FIG. 8, a diagram of one embodiment of a classifier 810 for predicting whether a machine under observation is infected. Identifications of the attributes with a high degree of predictive power with a respect to others of the attributes are provided as an input to classifier 810. In one embodiment, identifications of which attributes of malicious events have a threshold amount of predictive power are generated by a classifier (e.g., logistic regression model 610 of FIG. 6). The value of the threshold may vary from embodiment to embodiment.

Also, system events from a machine under observation are also provided to classifier 810. Based on the values of the attributes with the highest predictive power extracted from these system events, classifier 810 generates a prediction of whether a detected event, which occurred on the machine in the absence of the user, is suspicious. In some embodiments, classifier 810 can also generate a prediction that the machine is infected based on the events occurring on the machine in the absence of the user. The prediction(s) may be generated in a variety of different ways, depending on the embodiment. In one embodiment, a prediction may take on values between 0.0 and 1.0 (e.g., representative of a probability), and if the prediction is greater than a threshold (e.g., 0.5), then the machine is classified as being infected. In other embodiments, other prediction value ranges and other thresholds may be utilized. If the classifier predicts that a detected event is suspicious or that the machine under observation is infected, one or more security actions may be initiated. The security actions may include storing an indication that an event is suspect, notifying an administrator, generating a warning (e.g., popup, dialog box), disabling network access on the infected machine, launching a security application, and/or other actions. If an indication is stored that a given event is suspect, the machine can be subsequently scanned for malware.

Figure 9:
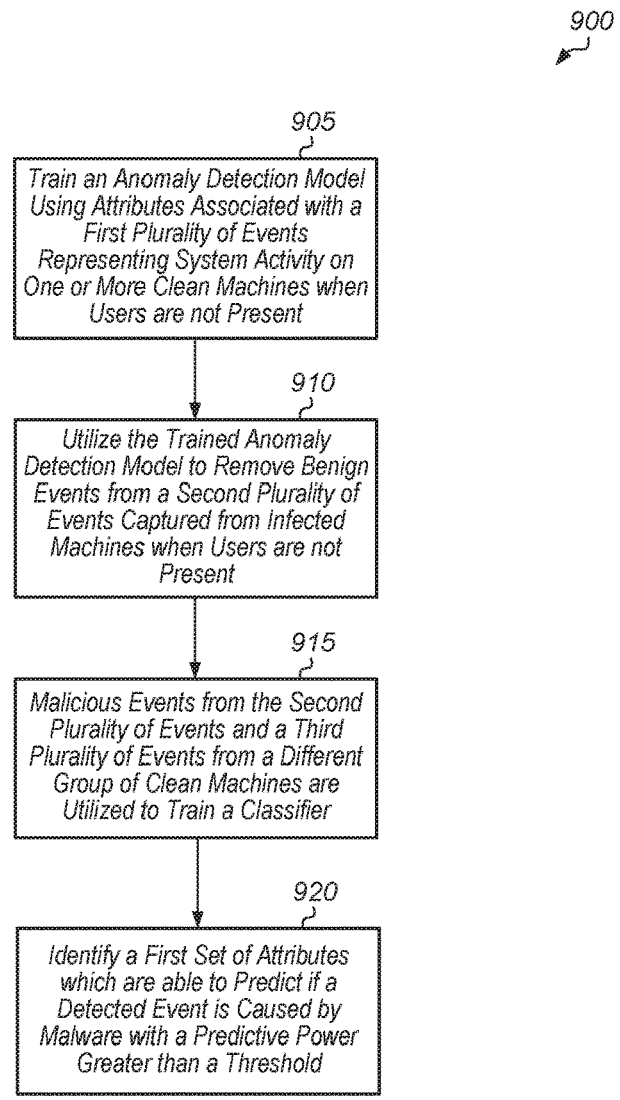
FIG. 9 is a generalized flow diagram illustrating one embodiment of a method for modeling malicious behavior that occurs in the absence of users.

Referring now to FIG. 9, one embodiment of a method 900 for modeling malicious behavior that occurs in the absence of users is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 900.

An anomaly detection model is trained using attributes associated with a first plurality of events representing system activity on one or more clean machines when users are not present (block 905). Next, the trained anomaly detection model removes benign events from a second plurality of events captured from infected machines when users are not present (block 910). The term "benign event" refers to an event caused by normal system behavior (i.e., non-malicious system behavior). The events that remain in the second plurality of events, after the benign events are filtered out, are the malicious events. The term "malicious event" refers to an event caused by malware.

Then, malicious events, from the second plurality of events, and a third plurality of events from a different group of clean machines are utilized to train a classifier (block 915). In one embodiment, the classifier is a logistic regression model. Next, the classifier identifies a first set of attributes which are able to predict if a detected event is caused by malware with a predictive power greater than a threshold (block 920). After block 920, method 900 ends.

Figure 10:
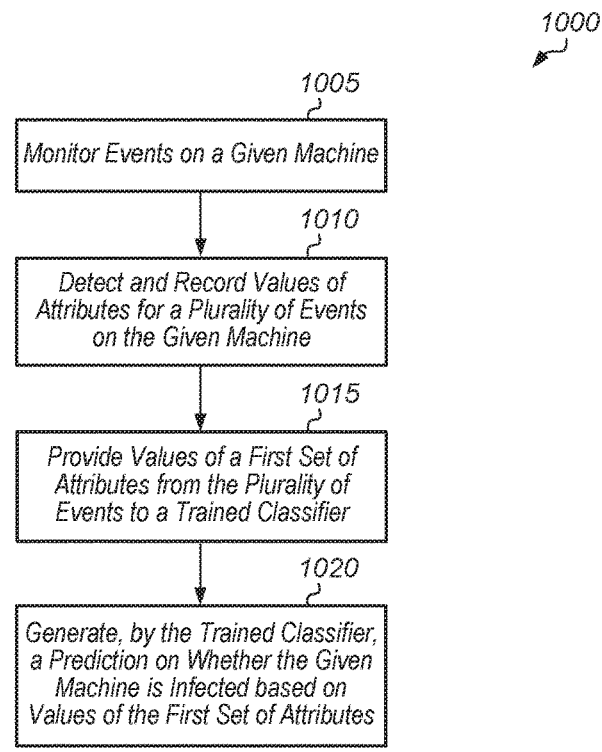
FIG. 10 is a generalized flow diagram illustrating one embodiment of a method for predicting whether a given machine is infected with malware.

Turning now to FIG. 10, one embodiment of a method 1000 for predicting whether a given machine is infected with malware is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Any of the various devices, apparatuses, or systems described herein may be configured to implement method 1000.

A system monitors events on a given machine (block 1005). The given machine may be any type of computing device or computing system, such as a computer, laptop, mobile device, server, tablet, wearable device, connected sensor, etc. In one embodiment, the system utilizes an agent which executes on the given machine, and the agent is configured to monitor and record events that occur on the given machine. While monitoring the given machine, the system detects and records values of attributes for a plurality of events on the given machine (block 1010).

Next, the system provides values of a first set of attributes from the plurality of events to a trained classifier (block 1015). In one embodiment, the trained classifier refers to a classifier trained using method 900 (of FIG. 9). The first set of attributes are attributes which were previously identified as having the most predictive power for determining if events are caused by malware. Then, the trained classifier identifies malicious behavior occurring in the absence of the user from the given machine based on values of the first set of attributes (block 1020). For example, in one embodiment, the trained classifier compares the values of the first set of attributes to different thresholds. Alternatively, in another embodiment, the trained classifier applies a weighting factor to each value of the first set of attributes, and then the trained classifier calculates a sum from the products of weighting factors and attribute values. This sum is then compared to a threshold to identify malicious behavior occurring in the absence of the user on the given machine. In other embodiments, other techniques may be utilized to identify whether malicious behavior is occurring on the given machine in the absence of the user. After block 1020, method 1000 ends.

Figure 11:
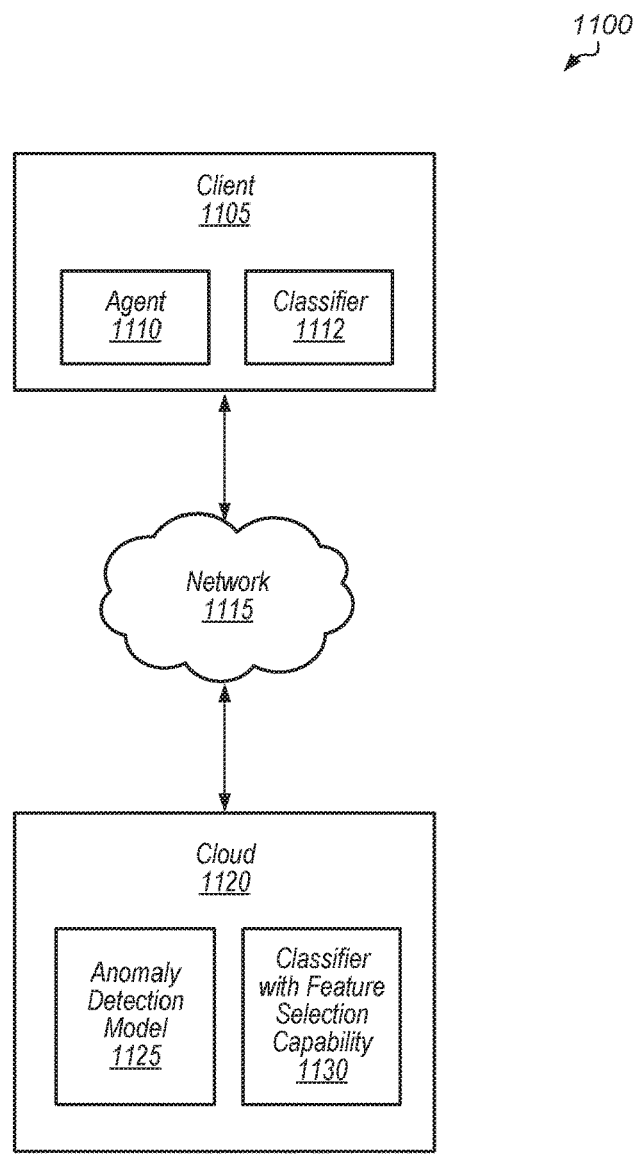
FIG. 11 is a block diagram of one embodiment of a system for modeling behavior in the absence of users.

Referring now to FIG. 11, a block diagram of one embodiment of a system 1100 for modeling system behavior that occurs in the absence of users is shown. In one embodiment, system 1100 includes client 1105, network 1115, and cloud 1120. Cloud 1120 is representative of any type of computing resources platform which is accessible to client 1105 via network 1115. Client 1105 is representative of any type of computing device (e.g., computer, laptop, mobile device). While only a single client 1105 is shown in FIG. 11, it should be understood that any number of clients may be coupled to cloud 1120 in other embodiments.

Client 1105 includes agent 1110 for monitoring system activity on client 1105 that occurs in the absence of users. When agent 1110 detects an event occurring on client 1105, agent 1110 records a plurality of attributes for the event. Agent 1110 may periodically convey the values of these attributes for a plurality of events to cloud 1120. Anomaly detection model 1125 is trained to filter out benign events from the events recorded on infected clients in the absence of users. Then, the remaining malicious events are used to train classifier with feature selection capability 1130 to identify the attributes with the most power in predicting behavior as malicious. In one embodiment, classifier 1130 is a LASSO logistic regression model. Once classifier 1130 has identified which attributes have the most predictive power, classifier 1130 sends identifications of these attributes to classifier 1112. Then, classifier 1112 monitors events occurring on client 1105 and determines if the events are caused by malware based on values of these most predictive attributes. In one embodiment, classifier 1112 generates a prediction for a given event that occurred on client 1105, with the prediction indicating the likelihood that the given event was caused by malware.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method of identifying malicious events occurring on computer devices in the absence of users, the method comprising:
   training an anomaly detection model using attributes associated with a first plurality of events representing system activity that occurs when users are not present on one or more first clean computer devices;
   utilizing the anomaly detection model to remove benign events from a second plurality of events captured from infected computer devices when users are not present;
   utilizing malicious events from the second plurality of events and benign events from a third plurality of events on one or more second clean computer devices to train a classifier; and
   utilizing the classifier to identify a first set of attributes which are able to predict if an event is malicious with a predictive power greater than a threshold.

2. The method as recited in claim 1, further comprising:
   receiving a request to determine whether a given computer device is clean or infected;
   detecting a fourth plurality of events on the given computer device; and
   utilizing values of the first set of attributes extracted from the fourth plurality of events to determine if the given computer device is clean or infected.

3. The method as recited in claim 2, further comprising generating a prediction on whether the given computer device is infected based on the values of the first set of attributes extracted from the fourth plurality of events.

4. The method as recited in claim 3, further comprising performing a security action with respect to the given computer device responsive to predicting the given computer device is infected.

5. The method as recited in claim 4, wherein the security action comprises one or more of storing an indication that an event is suspect, notifying an administrator, generating a warning, disabling network access, and launching a security application.

6. The method as recited in claim 1, wherein:
   clean computer devices are computer devices determined to be devoid of malware;
   infected computer devices are computer devices determined to be executing malware; and
   training the anomaly detection model comprises:
      identifying one or more clean computer devices which have not been infected with malware;
      detecting a plurality of events that occur on each clean computer device of the one or more clean computer devices;
      recording a plurality of attributes for each event of the plurality of events; and
      providing the plurality of attributes for the plurality of events to the anomaly detection model.

7. The method as recited in claim 1, further comprising receiving event attribute matrices, comprising the attributes for a plurality of events, from the one or more first clean computer devices, the infected computer devices, and the one or more second clean computer devices, wherein the rows of each matrix correspond to events, and wherein the columns of each matrix correspond to attributes.

8. A system comprising:
a memory; and
one or more processors coupled to the memory;
wherein the system is configured to:
   train an anomaly detection model using attributes associated with a first plurality of events representing system activity that occurs when users are not present on one or more first clean computer devices;
   utilize the anomaly detection model to remove benign events from a second plurality of events captured from infected computer devices when users are not present;
   utilize malicious events from the second plurality of events and benign events from a third plurality of events on one or more second clean computer devices to train a classifier; and
   utilize the classifier to identify a first set of attributes which are able to predict if an event is malicious with a predictive power greater than a threshold.

9. The system as recited in claim 8, wherein the system is further configured to:
   receive a request to determine whether a given computer device is clean or infected;
   detect a fourth plurality of events on the given computer device; and
   utilize values of the first set of attributes extracted from the fourth plurality of events to determine if the given computer device is clean or infected.

10. The system as recited in claim 9, wherein the system is further configured to generate a prediction on whether the given computer device is infected based on the values of the first set of attributes extracted from the fourth plurality of events.

11. The system as recited in claim 10, wherein the system is further configured to perform a security action with respect to the given computer device responsive to predicting the given computer device is infected.

12. The system as recited in claim 11, wherein the security action comprises one or more of storing an indication that an event is suspect, notifying an administrator, generating a warning, disabling network access, and launching a security application.

13. The system as recited in claim 8, wherein:
clean computer devices are computer devices determined to be devoid of malware;
infected computer devices are computer devices determined to be executing malware; and
training the anomaly detection model comprises:
   identifying one or more clean computer devices which have not been infected with malware;
   detecting a plurality of events that occur on each clean computer device of the one or more clean computer devices;
   recording a plurality of attributes for each event of the plurality of events; and
   providing the plurality of attributes for the plurality of events to the anomaly detection model.

14. The system as recited in claim 8, wherein the system is configured to receive event attribute matrices, comprising the attributes for a plurality of events, from the one or more first clean computer devices, the infected computer devices, and the one or more second clean computer devices, wherein the rows of each matrix correspond to events, and wherein the columns of each matrix correspond to attributes.

15. A non-transitory computer readable storage medium storing program instructions, wherein the program instructions are executable by a processor to:
   train an anomaly detection model using attributes associated with a first plurality of events representing system activity that occurs when users are not present on one or more first clean computer devices;
   utilize the anomaly detection model to remove benign events from a second plurality of events captured from infected computer devices when users are not present;
   utilize malicious events from the second plurality of events and benign events from a third plurality of events on one or more second clean computer devices to train a classifier; and
   utilize the classifier to identify a first set of attributes which are able to predict if an event is malicious with a predictive power greater than a threshold.

16. The non-transitory computer readable storage medium as recited in claim 15, wherein the program instructions are further executable by a processor to:
   receive a request to determine whether a given computer device is clean or infected;
   detect a fourth plurality of events on the given computer device; and
   utilize values of the first set of attributes extracted from the fourth plurality of events to determine if the given computer device is clean or infected.

17. The non-transitory computer readable storage medium as recited in claim 16, wherein the program instructions are further executable by a processor to generate a prediction on whether the given computer device is infected based on the values of the first set of attributes extracted from the fourth plurality of events.

18. The non-transitory computer readable storage medium as recited in claim 15, wherein the program instructions are further executable by a processor to perform a security action with respect to the given computer device responsive to predicting the given computer device is infected.

19. The non-transitory computer readable storage medium as recited in claim 18, wherein the security action comprises one or more of storing an indication that an event is suspect, notifying an administrator, generating a warning, disabling network access, and launching a security application.

20. The non-transitory computer readable storage medium as recited in claim 19, wherein:
clean computer devices are computer devices determined to be devoid of malware;
infected computer devices are computer devices determined to be executing malware; and
training the anomaly detection model comprises:
   identifying one or more clean computer devices which have not been infected with malware;
   detecting a plurality of events that occur on each clean computer device of the one or more clean computer devices;
   recording a plurality of attributes for each event of the plurality of events; and
   providing the plurality of attributes for the plurality of events to the anomaly detection model.

* * * * *